United States Patent
Xiao (10) Patent No.: US 9,288,064 B2
(45) Date of Patent: *Mar. 15, 2016

(54) TRUST INFORMATION DELIVERY SCHEME FOR CERTIFICATE VALIDATION

(71) Applicant: TVWorks, LLC, Philadelphia, PA (US)

(72) Inventor: Sihai Xiao, Freemont, CA (US)

(73) Assignee: TVWorks, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,417

(22) Filed: Dec. 15, 2014

(65) Prior Publication Data

US 2015/0100786 A1    Apr. 9, 2015

Related U.S. Application Data (60) Continuation of application No. 13/863,507, filed on Apr. 16, 2013, now Pat. No. 8,935,525, which is a continuation of application No. 13/248,744, filed on Sep. 29, 2011, now Pat. No. 8,433,898, which is a continuation of application No. 12/427,455, filed on Apr. 21, 2009, now Pat. No. 8,078,866, which is a division of application No. 10/057,066, filed on Jan. 25, 2002, now Pat. No. 7,536,544.

(51) Int. Cl.
*H04L 29/06* (2006.01)
*H04L 9/32* (2006.01)
*G06F 21/33* (2013.01)
*G06F 21/60* (2013.01)

(52) U.S. Cl.
CPC .............. *H04L 9/3268* (2013.01); *G06F 21/33* (2013.01); *G06F 21/604* (2013.01); *H04L 9/3236* (2013.01); *H04L 9/3239* (2013.01); *H04L 9/3265* (2013.01); *H04L 63/0823* (2013.01); *G06F 2221/2145* (2013.01); *G06F 2221/2151* (2013.01); *H04L 2209/56* (2013.01)

(58) Field of Classification Search
CPC ..... G06F 21/33; G06F 21/335; H04L 9/3223; H04L 63/08; H04L 63/0823
See application file for complete search history.

(56) References Cited

U.S. PATENT DOCUMENTS

| 4,035,835 | A | 7/1977 | Poetsch |
| 4,589,013 | A | 5/1986 | Vlahos et al. |

(Continued)

FOREIGN PATENT DOCUMENTS

| WO | 94/14284 A1 | 6/1994 |
| WO | 98/28698 A1 | 7/1998 |
| WO | 0077974 A1 | 12/2000 |

OTHER PUBLICATIONS

Freier, Alan O. et al., "The SSL Protocol Version 3.0," Mar. 1996, pp. 1-52, Netscape.

(Continued)

*Primary Examiner* — Edward Zee
(74) *Attorney, Agent, or Firm* — Banner & Witcoff, Ltd.

(57) ABSTRACT

A unique TIO based trust information delivery scheme is disclosed that allows clients to verify received certificates and to control Java and Javascript access efficiently. This scheme fits into the certificate verification process in SSL to provide a secure connection between a client and a Web server. In particular, the scheme is well suited for incorporation into consumer devices that have a limited footprint, such as set-top boxes, cell phones, and handheld computers. Furthermore, the TIO update scheme disclosed herein allows clients to update certificates securely and dynamically.

19 Claims, 3 Drawing Sheets

(56) References Cited

U.S. PATENT DOCUMENTS

| | | |
|---|---|---|
| 4,694,329 A | 9/1987 | Belmares-Sarabia et al. |
| 4,697,209 A | 9/1987 | Kiewit et al. |
| 4,868,557 A | 9/1989 | Perlman |
| 4,868,877 A | 9/1989 | Fischer |
| 4,888,801 A | 12/1989 | Foster et al. |
| 4,893,114 A | 1/1990 | Ishii |
| 5,001,697 A | 3/1991 | Torres |
| 5,005,011 A | 4/1991 | Perlman et al. |
| 5,009,363 A | 4/1991 | Zavatone |
| 5,043,714 A | 8/1991 | Perlman |
| 5,065,143 A | 11/1991 | Greaves et al. |
| 5,065,231 A | 11/1991 | Greaves et al. |
| 5,097,257 A | 3/1992 | Clough et al. |
| 5,117,074 A | 5/1992 | Yanai et al. |
| 5,119,074 A | 6/1992 | Greaves et al. |
| 5,130,800 A | 7/1992 | Johnson et al. |
| 5,155,847 A | 10/1992 | Kirouac et al. |
| 5,202,828 A | 4/1993 | Vertelney et al. |
| 5,204,947 A | 4/1993 | Bernstein et al. |
| 5,206,951 A | 4/1993 | Khoyi et al. |
| 5,224,163 A | 6/1993 | Gasser et al. |
| 5,307,173 A | 4/1994 | Yuen et al. |
| 5,321,750 A | 6/1994 | Nadan |
| 5,321,806 A | 6/1994 | Meinerth et al. |
| 5,347,622 A | 9/1994 | Takemoto et al. |
| 5,347,632 A | 9/1994 | Filepp et al. |
| 5,365,360 A | 11/1994 | Torres |
| 5,367,316 A | 11/1994 | Ikezaki |
| 5,373,561 A | 12/1994 | Haber et al. |
| 5,390,295 A | 2/1995 | Bates et al. |
| 5,436,673 A | 7/1995 | Bachmann et al. |
| 5,444,861 A | 8/1995 | Adamec et al. |
| 5,453,779 A | 9/1995 | Dan et al. |
| 5,471,577 A | 11/1995 | Lightbody et al. |
| 5,481,294 A | 1/1996 | Thomas et al. |
| 5,495,610 A | 2/1996 | Shing et al. |
| 5,497,422 A | 3/1996 | Tysen et al. |
| 5,530,865 A | 6/1996 | Owens et al. |
| 5,532,732 A | 7/1996 | Yuen et al. |
| 5,541,638 A | 7/1996 | Story |
| 5,546,525 A | 8/1996 | Wolf et al. |
| 5,548,702 A | 8/1996 | Li et al. |
| 5,553,123 A | 9/1996 | Chan et al. |
| 5,558,339 A | 9/1996 | Perlman |
| 5,572,643 A | 11/1996 | Judson |
| 5,581,686 A | 12/1996 | Koppolu et al. |
| 5,583,560 A | 12/1996 | Florin et al. |
| 5,584,025 A | 12/1996 | Keithley et al. |
| 5,585,858 A | 12/1996 | Harper et al. |
| 5,586,257 A | 12/1996 | Perlman |
| 5,594,509 A | 1/1997 | Florin et al. |
| 5,600,364 A | 2/1997 | Hendricks et al. |
| 5,621,456 A | 4/1997 | Florin et al. |
| 5,621,797 A | 4/1997 | Rosen |
| 5,624,316 A | 4/1997 | Roskowski et al. |
| 5,634,051 A | 5/1997 | Thomson |
| 5,636,209 A | 6/1997 | Perlman |
| 5,638,523 A | 6/1997 | Mullet et al. |
| 5,642,419 A | 6/1997 | Rosen |
| 5,654,748 A | 8/1997 | Matthews, III |
| 5,657,378 A | 8/1997 | Haddock et al. |
| 5,659,616 A | 8/1997 | Sudia |
| 5,671,445 A | 9/1997 | Gluyas et al. |
| 5,680,458 A | 10/1997 | Spelman et al. |
| 5,701,451 A | 12/1997 | Rogers et al. |
| 5,703,995 A | 12/1997 | Willbanks |
| 5,708,845 A | 1/1998 | Wistendahl et al. |
| 5,717,757 A | 2/1998 | Micali |
| 5,717,939 A | 2/1998 | Bricklin et al. |
| 5,724,567 A | 3/1998 | Rose et al. |
| 5,727,129 A | 3/1998 | Barrett et al. |
| 5,734,853 A | 3/1998 | Hendricks et al. |
| 5,737,599 A | 4/1998 | Rowe et al. |
| 5,740,549 A | 4/1998 | Reilly et al. |
| 5,745,109 A | 4/1998 | Nakano et al. |
| 5,745,574 A | 4/1998 | Muftic |
| 5,747,757 A | 5/1998 | Van Zeeland et al. |
| 5,752,042 A | 5/1998 | Cole et al. |
| 5,752,045 A | 5/1998 | Chen |
| 5,754,178 A | 5/1998 | Johnston, Jr. et al. |
| 5,754,938 A | 5/1998 | Herz et al. |
| 5,754,939 A | 5/1998 | Herz et al. |
| 5,757,920 A | 5/1998 | Misra et al. |
| 5,758,111 A | 5/1998 | Shiratori et al. |
| 5,760,549 A | 6/1998 | Kobayashi |
| 5,761,306 A | 6/1998 | Lewis |
| 5,761,662 A | 6/1998 | Dasan |
| 5,764,992 A | 6/1998 | Kullick et al. |
| 5,764,993 A | 6/1998 | Shindo |
| 5,768,389 A | 6/1998 | Ishii |
| 5,774,540 A | 6/1998 | Davidson et al. |
| 5,774,664 A | 6/1998 | Hidary et al. |
| 5,781,228 A | 7/1998 | Sposato |
| 5,784,058 A | 7/1998 | LaStrange et al. |
| 5,784,463 A | 7/1998 | Chen et al. |
| 5,787,172 A | 7/1998 | Arnold |
| 5,787,182 A | 7/1998 | Hoshino et al. |
| 5,790,796 A | 8/1998 | Sadowsky |
| 5,796,840 A | 8/1998 | Davis |
| 5,796,841 A | 8/1998 | Cordery et al. |
| 5,801,787 A | 9/1998 | Schein et al. |
| 5,802,284 A | 9/1998 | Karlton et al. |
| 5,808,628 A | 9/1998 | Hinson et al. |
| 5,809,242 A | 9/1998 | Shaw et al. |
| 5,809,287 A | 9/1998 | Stupek, Jr. et al. |
| 5,815,679 A | 9/1998 | Liu |
| 5,818,441 A | 10/1998 | Throckmorton et al. |
| 5,828,837 A | 10/1998 | Eikeland |
| 5,832,223 A | 11/1998 | Hara et al. |
| 5,835,919 A | 11/1998 | Stern et al. |
| 5,838,775 A | 11/1998 | Montalbano |
| 5,841,896 A | 11/1998 | Tsuchiya |
| 5,841,978 A | 11/1998 | Rhoads |
| 5,848,352 A | 12/1998 | Dougherty et al. |
| 5,848,396 A | 12/1998 | Gerace |
| 5,850,232 A | 12/1998 | Engstrom et al. |
| 5,852,665 A | 12/1998 | Gressel et al. |
| 5,852,673 A | 12/1998 | Young |
| 5,859,969 A | 1/1999 | Oki et al. |
| 5,861,871 A | 1/1999 | Venable |
| 5,862,325 A | 1/1999 | Reed et al. |
| 5,867,166 A | 2/1999 | Myhrvold et al. |
| 5,870,559 A | 2/1999 | Leshem et al. |
| 5,870,759 A | 2/1999 | Bauer et al. |
| 5,870,765 A | 2/1999 | Bauer et al. |
| 5,874,967 A | 2/1999 | West et al. |
| 5,877,741 A | 3/1999 | Chee et al. |
| 5,887,243 A | 3/1999 | Harvey et al. |
| 5,892,536 A | 4/1999 | Logan et al. |
| 5,907,315 A | 5/1999 | Vlahos et al. |
| 5,907,322 A | 5/1999 | Kelly et al. |
| 5,913,040 A | 6/1999 | Rakavy et al. |
| 5,919,849 A | 7/1999 | Memon et al. |
| 5,923,379 A | 7/1999 | Patterson |
| 5,926,624 A | 7/1999 | Katz et al. |
| 5,929,849 A | 7/1999 | Kikinis |
| 5,933,811 A | 8/1999 | Angles et al. |
| 5,936,606 A | 8/1999 | Lie |
| 5,946,664 A | 8/1999 | Ebisawa |
| 5,948,061 A | 9/1999 | Merriman et al. |
| 5,949,432 A | 9/1999 | Gough et al. |
| 5,956,404 A | 9/1999 | Schneier et al. |
| 5,959,623 A | 9/1999 | van Hoff et al. |
| 5,974,461 A | 10/1999 | Goldman et al. |
| 5,977,960 A | 11/1999 | Nally et al. |
| 5,982,445 A | 11/1999 | Eyer et al. |
| 5,982,898 A | 11/1999 | Hsu et al. |
| 5,991,542 A | 11/1999 | Han et al. |
| 5,991,799 A | 11/1999 | Yen et al. |
| 6,005,574 A | 12/1999 | Herrod |
| 6,006,034 A | 12/1999 | Heath et al. |
| 6,006,257 A | 12/1999 | Slezak |
| 6,009,274 A | 12/1999 | Fletcher et al. |
| 6,009,363 A | 12/1999 | Beckert et al. |

(56) References Cited

U.S. PATENT DOCUMENTS

| | | | |
|---|---|---|---|
| 6,018,768 A | 1/2000 | Ullman et al. | |
| 6,026,467 A | 2/2000 | Petty | |
| 6,028,583 A | 2/2000 | Hamburg | |
| 6,028,600 A | 2/2000 | Rosin et al. | |
| 6,028,853 A | 2/2000 | Haartsen | |
| 6,034,689 A | 3/2000 | White et al. | |
| 6,044,403 A | 3/2000 | Gerszberg et al. | |
| 6,046,835 A | 4/2000 | Yamawaki et al. | |
| 6,047,269 A | 4/2000 | Biffar | |
| 6,049,628 A | 4/2000 | Chen et al. | |
| 6,049,671 A | 4/2000 | Slivka et al. | |
| 6,049,835 A | 4/2000 | Gagnon | |
| 6,058,430 A | 5/2000 | Kaplan | |
| 6,061,058 A | 5/2000 | Owens et al. | |
| 6,064,375 A | 5/2000 | Velez et al. | |
| 6,064,376 A | 5/2000 | Berezowski et al. | |
| 6,072,489 A | 6/2000 | Gough et al. | |
| 6,073,119 A | 6/2000 | Bornemisza-Wahr et al. | |
| 6,073,199 A | 6/2000 | Cohen et al. | |
| 6,073,241 A | 6/2000 | Rosenberg et al. | |
| 6,094,485 A | 7/2000 | Weinstein et al. | |
| 6,104,727 A | 8/2000 | Moura et al. | |
| 6,108,014 A | 8/2000 | Dye | |
| 6,199,204 B1 | 3/2001 | Donohue | |
| 6,202,207 B1 | 3/2001 | Donohue | |
| 6,205,485 B1 | 3/2001 | Kikinis | |
| 6,240,555 B1 | 5/2001 | Shoff et al. | |
| 6,263,501 B1 | 7/2001 | Schein et al. | |
| 6,285,985 B1 | 9/2001 | Horstmann | |
| 6,304,974 B1 | 10/2001 | Samar | |
| 6,305,020 B1 | 10/2001 | Hoarty et al. | |
| 6,313,854 B1 | 11/2001 | Gibson | |
| 6,326,969 B1 | 12/2001 | Helman et al. | |
| 6,326,970 B1 | 12/2001 | Mott et al. | |
| 6,341,373 B1 | 1/2002 | Shaw | |
| 6,351,745 B1 | 2/2002 | Itakura et al. | |
| 6,367,012 B1 | 4/2002 | Atkinson et al. | |
| 6,367,080 B1 | 4/2002 | Enomoto et al. | |
| 6,381,741 B1 | 4/2002 | Shaw | |
| 6,400,371 B1 | 6/2002 | Helman et al. | |
| 6,418,556 B1 | 7/2002 | Bennington et al. | |
| 6,459,427 B1 | 10/2002 | Mao et al. | |
| 6,487,658 B1 | 11/2002 | Micali | |
| 6,510,557 B1 | 1/2003 | Thrift | |
| 6,539,480 B1 * | 3/2003 | Drews | 713/191 |
| 6,604,242 B1 | 8/2003 | Weinstein et al. | |
| 6,668,278 B1 | 12/2003 | Yen et al. | |
| 6,816,900 B1 | 11/2004 | Vogel et al. | |
| 6,842,863 B1 | 1/2005 | Fox et al. | |
| 6,970,862 B2 | 11/2005 | Kwan | |
| 7,072,948 B2 | 7/2006 | Yen et al. | |
| 7,477,832 B2 | 1/2009 | Young et al. | |
| 7,536,544 B2 | 5/2009 | Xiao | |
| 7,631,188 B2 | 12/2009 | Valente | |
| 8,078,866 B2 | 12/2011 | Xiao | |
| 8,433,898 B2 | 4/2013 | Xiao | |
| 8,935,525 B2 | 1/2015 | Xiao | |
| 2001/0001160 A1 | 5/2001 | Shoff et al. | |
| 2002/0007493 A1 | 1/2002 | Butler et al. | |
| 2002/0026634 A1 | 2/2002 | Shaw | |
| 2002/0078347 A1 | 6/2002 | Hericourt et al. | |
| 2002/0144149 A1 | 10/2002 | Hanna et al. | |
| 2002/0147905 A1 | 10/2002 | Perlman | |
| 2002/0152382 A1 | 10/2002 | Xiao | |
| 2004/0133655 A1 | 7/2004 | Yen et al. | |
| 2004/0148636 A1 | 7/2004 | Weinstein et al. | |
| 2004/0172661 A1 | 9/2004 | Yagawa et al. | |
| 2005/0015815 A1 | 1/2005 | Shoff et al. | |
| 2006/0069913 A1 | 3/2006 | Valente | |
| 2009/0222574 A1 | 9/2009 | Xiao | |
| 2012/0023328 A1 | 1/2012 | Xiao | |
| 2013/0019260 A1 | 1/2013 | Weinstein et al. | |
| 2013/0283042 A1 | 10/2013 | Xiao | |

OTHER PUBLICATIONS

Kaliski, Burton S., "A Layman's Guide to a Subset of ASN.1, BER and DER," Nov. 1, 1993, pp. 1-38, RSA Laboratories.

Malpani, Am Barish et al., "Simple Certificate Validation Protocol (SCVP)," Jul. 2001, pp. 1-23.

PKCS #7: Cryptographic Message Syntax Standard, Nov. 1993, pp. 1-29, RSA Laboratories.

U.S. Appl. No. 09/330,274, filed Jun. 11, 1999.

Bussey HE et al: "Service Architecture, Prototype Description, and Network Implications of a Personalized Information Grazing Service" Multiple Facets of Integration, San Francisco, Jun. 3-7, 1990, Institute of Electrical and Electronic Engineers pp. 1 046-1 053, XPOOO 164339 see whole document.

Lang K: "NewsWeeder: learning to filter news" Machine Learning. Proceedings of the Twelfth International Conference on Machine Learning, Tahoe City, CA, USA, Jul. 9-12, 1995, San Francisco, CA. USA. Morgan Kaufmann Publishers, USA. pp. 331-339, XP002046557 see whole document.

Rosenfeld L B, et al: "Automatic Filtering of Internet Postings" Online. vol. 18, No. 3, May 1994, pp. 27-30, XP000616769 see whole document.

60047809_filing_date.pdf, New Provisional Patent Application Cover Sheet dated May 16, 1997 for U.S. Appl. No. 60/047,809.

K. L. Alexandrini, "A Look at Computer Graphics," Computer Teaching, pp. 23-25 (Feb. 1985) (abstract only).

Wyle M. F., "A Wide Area Network Information Filter" Proceedings International Conference Artificial Intelligence on Wall Street, Oct. 9, 1991, pp. 10-15, XP000534152 see the whole document.

Yan T. W., et al.: "Sift-A Tool for Wide-Area Information Dissemination" Usenix Technical Confeence, Jan. 16, 1995, pp. 177-186, XP000617276 see the whole document.

"Laura Lemay, ""Microsoft FrontPage 97"" 2nd Edition, Sams. net Publishing, pp. 267-281, Jan. 1997."

"Hauptmann & Wasel, ""On-line Maintenance with On-the-fly Software Replacement,"" Proceedings of IEEE Third International Conference on Configurable Distributed Systems, May 6-8, 1996, pp. 70-80."

"Segal & Frieder, ""On-The-Fly Program Modification: Systems for Dynamic Updating,"" IEEE Software, Mar. 1993, pp. 53-65."

"Frieder et al. Dynamically Updating Distributed Software: Supporting Change in Uncertain and Mistrustful Environments. IEEE. pp. 254-261. Jan. 1989."

User and Installation Guide from JVC. Page 3, found at <http://www.jvc-america.com/digital_satellites/ds_systems. html>, Mar. 18, 1998.

Dish Network: "The Integrated Satellite TV Receiver & Digital VHS Recorder System" from JVC and DISH Network, 1997, p. 2.

Bruce Schneier: "Applied Cryptography," 2nd Edition, John Wiley & Sons, Oct. 1995, pp. 185-187, 574-576.

Ellerman, Castedo, "Channel Definition Format (CDF)", Mar. 9, 1997, W3C.

Kindel, Charlie et al., "Inserting Objects into HTML", Feb. 18, 1997, W3C.

Maloney, Murray, "Implementing HTML Frames", Mar. 31, 1997, W3C.

Zigmond, D., "Uniform Resource Locators for Television Broadcasts", Jun. 1997, IETF.

Zigmond, D., "Uniform Resource Locators for Television and Telephony", published Nov. 4, 1996.

"Dish Network: ""What America Demands: Lower Cost, More Choice, Greater Value . . . "" From JVC/DISH Network Advantage." Filed in U.S. Appl. No. 09/080,577 before Apr. 30, 2002.

* cited by examiner

TRUST INFORMATION DELIVERY SCHEME FOR CERTIFICATE VALIDATION

CROSS REFERENCE TO RELATED APPLICATIONS

This application is a continuation application of U.S. patent application Ser. No. 13/863,507 filed Apr. 16, 2013, and entitled "Trust Information Delivery Scheme for Certificate Validation", which is a continuation application of U.S. patent application Ser. No. 13/248,744 filed Sep. 29, 2011, which issued Apr. 30, 2013, as U.S. Pat. No. 8,433,898, and entitled "Trust Information Delivery Scheme for Certificate Validation," which is a continuation application of U.S. patent application Ser. No. 12/427,455 filed Apr. 21, 2009, which issued Dec. 13, 2011, as U.S. Pat. No. 8,078,866, and entitled "Trust Information Delivery Scheme for Certificate Validation," which is a divisional application of U.S. patent application Ser. No. 10/057,066 filed Jan. 25, 2002, which issued May 19, 2009, as U.S. Pat. No. 7,536,544, and is entitled "Trust Information Delivery Scheme for Certificate Validation," the entire disclosures of which are hereby incorporated by reference.

TECHNICAL FIELD

The invention relates to maintaining security in an electronic network. More particularly, the invention relates to a trust information delivery scheme for certificate validation.

BACKGROUND

The Secure Socket Layer (SSL) protocol (e.g., SSL Protocol Version 3.0) is presently the de facto industry standard for Web security. In fact, because most E-commerce applications are based on the Web, the SSL protocol is built into almost all Web servers and browsers, such as Netscape Enterprise Server, Microsoft Web Server, Netscape Communicator, and Microsoft Internet Explorer (IE).

The SSL protocol uses public key cryptography in conjunction with an X.509 certificate to provide server authentication and, optionally, client authentication. During the authentication process, the server sends its X.509 certificate chain which may or may not contain the root CA certificate who signed the server certificate to the client as part of the handshake messages the client and server exchange at the start of a session. The client validates the server's certificate through a normal certificate verification procedure if it has the server's certificate, it has the certification authority's (CA) certificate that signed the server's certificate, and it has associated trust information.

A common approach for providing the CA certificates and associated trust information to the client is to hard code a certificate database into the client software, such as done in Netscape Communicator and Microsoft IE. In this scheme, certificate management is up to the end users. For example, if a CA certificate is expired, it is the end users' responsibility to perform a new CA certificate rollover. Furthermore, the client hardware needs sufficient storage space to hold the certificate database, which usually ranges from 100K to 400 k. This is typically not a problem in the personal computer environment.

However, the above approach cannot be applied to mass market applications that run on the consumer appliances, such as set-top boxes, hand-held computers, pagers, and cell phones, due to at least any of the following reasons:

Public CA root certificates, as with substantially all certificates, expire and their lifetime may not fit nicely within the expected shelf-life or lifetime of a consumer product. Thus, a mechanism for securely updating CA root certificates is desirable.

In the unlikely event that a public CA's private root key is compromised, its root certificate must be revoked. Some trusted entity has to assume responsibility for revoking all compromised CA root certificates. In the personal computer environment, end users can revoke the root certificate by updating the client software if the compromised CA certificate is embedded in the client software. However, updating the software per each expired certificate is not practical in the consumer product environment because, e.g. it is practically impossible to recall all of the devices for participation in the update.

The typical consumer electronics user is unsophisticated with regard to security and, as such, cannot be expected to participate in the maintenance of the trust knowledge information base. In the consumer device environment, maintenance of the trust knowledge information base must occur transparently to the user and in a secure fashion.

Most consumer electronic devices have a limited amount of non-volatile flash memory where CA root certificates and associated trust information can be stored. It is important to minimize the usage of this memory space.

Current or Known Solutions

The SSL protocol itself does not specify how the root CA certificate validation should be implemented. Thus, such implementation is very much vendor dependent and proprietary to each vendor. There are very few publications regarding to this issue. Some well-known implementations are Netscape Communicator and Microsoft IE, which are based on a certificate database embedded in the browser software. In March 2001, an IETF draft, the Simple Certificate Validation Protocol (SCVP) regarding such certificate validation was published. The proposed protocol is based on a server that performs certificate validation.

The SCVP scheme uses a simple request-response model, which is briefly described as follows:

Upon receiving a certificate, the client sends a certificate validation request to a server. The request is optionally signed and contains the certificate in question and other parameters, such as extensions, as well as an answer that the client wants the server to provide. Based on the request, the server generates a response, signs it, and returns it to the client.

One advantage of the mechanism provided in this proposal is that it simplifies the client implementation for certificate validation, and it can be used as a general approach for clients to verify received certificates, including server certificates, in SSL. However, the protocol only addresses communications and does not address certificate management at the client endpoint. For example, it is important to provide a mechanism for delivering and updating root certificates that are needed to verify the server's responses, but such mechanism is not addressed in the proposal. The set of root certificates is the initial trust point for such protocol. Without an initial trust point, the certificate validation mechanism is still vulnerable.

Liberate Technologies of San Carlos, Calif. has developed a server-based certificate management mechanism that securely delivers root certificates and associated trust information to clients. With this scheme, the server certificates in SSL can be seamlessly validated. Such scheme fits particularly well into consumer devices and solves the problem of maintaining an initial trust point in the certificate chain, discussed above.

The Liberate mechanism works substantially as follows:

The building block of the scheme is the Root Security Information Object (RSIO), which is a data object that contains the following sets of information:

- A chain of Trusted Information Provider's (software provider, device owner, and Enhanced Service Provider (ESP)) Root Certificates. For the device owner and ESP, the chain only contains the most recent device owner/ESP root certificate.
- A trust table consisting of a set of SHA-1 hash values of the trusted certificates. For each hash value in the table, there is a bit vector describing the operations for which the certificate is trusted, i.e. the trust vector, and a bit vector describing the operations which the certificate is trusted to delegate to other certificates. The table is digitally signed by the subject who provided the object.
- A timestamp indicating the time this object is created.
- The digital signature of the trust table.

The Liberate mechanism typically involves three business entities, e.g. the software provider, a device owner, and an ESP, which forms a hierarchy with the software provider at the top, the device owner in the middle, and the ESP in the bottom. Each of the three entities provides an RSIO that is based on its own requirements. The root certificate of each entity must be submitted to, and verified by, the entity in the next higher level of the hierarchy and included in its RSIO. Thus, the RSIOs also form a hierarchy linked by their root certificates with the software provider RSIO at the top, the device owner RSIO in the middle, and the ESP RSIO at the bottom. Based on the RSIOs, the server constructs a Hierarchical Root Security Information Object (HRSIO) and delivers it to the client during the client boot up time.

The HRSIO contains the following information:

- A chain of software provider Root Certificates.
- A trust table signed by the most recent software provider Root Certificate.
- One or more trust tables signed by trusted device owners and the device owner's Root Certificates.
- A trust table signed by a trusted ESP and the ESP Root Certificate.

The software provider root certificate is stored into the ROM of each client device during the manufacture process. Thus, upon receiving a HRSIO, the client can verify it through a chain of validation.

When a client attempts to initiate an SSL connection to a server, it proceeds through the phases of the SSL handshake. The discussion herein does not attempt to present the SSL protocol in detail, but rather highlights the points at which HRSIO information is used. In the initial phases of the handshake, the server presents its certificate and, optionally, the CA certificate that signed its certificate.

The proposed scheme has a significant advantage over the old scheme because of the following:

In the RSIO scheme, each hash value in the trust table is computed using the whole certificate information as the input. Consequently, having two certificates with different validity (a field contained in the certificate) results in two different hash values. This property creates an unnecessary failure in the SSL certificate chain validation in a common scenario:

When the client receives a server certificate chain that contains the renewal of an expired root CA certificate and the client trust table only contains the old root CA certificate because the trust table has not been updated yet. In this case, the SSL certificate chain validation fails because the hashes of the two certificates do not match. That means, whenever a certificate expired in the RSIO, the corresponding RSIO provider has to update the certificate in its RSIO and reconstruct a new RSIO and deliver the updated trust table to the client. This actually needs to go through the whole RSIO update procedure.

However, it is a common practice to renew the CA certificate by extending the validity of the old certificate based on the same key pair if it has not been compromised. This practice is to minimize migration problems for the CAs. Thus, in this case, the RSIO update is unnecessary because the old certificate still should be treated as valid even it is expired because the old and the new certificate share the same key. This problem is perfectly solved in the proposed scheme by hashing the public key portion of the certificate during the creation of the trust table.

The client can then determine whether or not to continue the handshake by performing the following checks:

- Verify that the certificate is valid at the current time.
- Hash the server certificate, e.g. using SHA-1, and check to see if it is in the trust table. If so, the handshake can proceed if the trust vector indicates that the certificate is an SSL server certificate. If the hash is in the table, but the SSL server bit is not set in the trust vector, the handshake immediately fails. If the hash is not in the table, proceed to the next check.
- If the CA's Root Certificate was not presented, retrieve it from the Security Service on the server.
- Verify the digital signature on the server certificate, and verify that the signature came from the named CA using the CA's Root Certificate.
- Hash the CA's Root Certificate, and check to see if it is in the trust table.
- Verify that the table entry for the CA's Root Certificate is marked as trusted as a CA for issuing SSL server certificates.

Once all these checks are complete, the client continues the SSL handshake by negotiating a cipher suite and exchanging keys with the server, and then begins transferring encrypted data.

Although the Liberate mechanism solves several problems, such approaches may have one or more of the following disadvantages:

- There are too many dependencies on the software provider. A software company may not be qualified to behave as a CA and perform certificate management. For example, if the software provider's root certificate is compromised then the whole system may be vulnerable.
- There is too much burden for the device owner and ESP. They must go through a series of steps to update their root certificates whenever their root certificates are expired or compromised. For example, the device owner must submit its new root certificate to the software provider and wait for a new RSIO that includes the new root certificate from the software provider. Then, the device owner must reconstruct a RSIO and deliver it to the ESP. The ESP must then reconstruct an RSO and deliver the updated information to the clients.
- Such procedure is complicated. In the reality, the device owner and ESP are often the same party and, thus, the three-level hierarchy is redundant and creates overhead. Further, there are many human interactions involved whenever information in the RSIO must be updated. In such case, the turn around time may be too long.

It would be advantageous to provide a simplified trust information delivery scheme for certificate validation.

SUMMARY

The invention provides a simplified trust information delivery scheme for certificate validation. The presently preferred embodiment of the invention comprises a server based certificate management mechanism that delivers certificates and associated trust information for clients to verify received certificates. Such scheme works effectively with SSL to provide server authentication. Such scheme may also be used for Javascript access control. The scheme especially fits into the consumer device environment.

In the preferred embodiment, a unique TIO based trust information delivery scheme allows clients to verify received certificates and control Javascript access efficiently. This scheme fits into the certificate verification process in SSL to provide a secure connection between a client and a Web server.

In particular, the scheme is well suited for integration into consumer devices that have a limited footprint, such as set-top boxes, cell phones, and handheld computers. In such devices, it is not practical to hardcode a certificate database, which usually ranges from 50K to 400 k in size, into the client memory due to limited amount of storage available in such consumer devices. Using the herein disclosed TIO technique, the size problem is substantially solved. Furthermore, the TIO update scheme allows clients, i.e. consumer devices, to update certificates securely and dynamically.

A key observation in connection with the invention herein is that in general, due to the limited resources such as memory and computing power, consumer devices need server support to browse a network, such as the Internet. The main function of such server is to reformat or transcode Web page contents so that the clients can display the results. Typically, transcoding servers are hosted by device owners, such as cable operators, ISPs, and broadcasters. The invention provides a mechanism by which these entities are the TIO providers that deliver the TIO to their client devices to enable the SSL functionality.

DETAILED DESCRIPTION

The presently preferred embodiment of the invention (see FIG. 1) comprises a scheme that allows Trust Information Providers (TIP) 10, e.g. cable operators, ISPs, and OEMs, to deliver certificates with associated trust information to clients 12 for verification of the received certificates. The scheme also allows the TIP to update the certificates and associated trust information sent to clients, and it operates in connection with both flash and non-flash based clients.

A key observation in connection with the invention herein is that in general, due to the limited resources such as memory and computing power, consumer devices need server support to browse a network, such as the Internet. The main function of such server is to reformat or transcode Web page contents so that the clients can display the results. Typically, transcoding servers are hosted by device owners, such as cable operators, ISPs, and broadcasters. The invention provides a mechanism by which these entities are the TIO providers that deliver a trust information object (TIO) 14 to their client devices to enable SSL functionality.

Trust Information Object (TIO)

Conceptually, a Trust Information Object (TIO) is a table of two columns having a timestamp, the number of signatures and, optionally, digital signatures. Each row of the table consists of the hash value of a trust entity certificate, such as Root CA Certificate, and its associated trust information indicating the level of the trust for this entity. Table "A" below illustrates an exemplary structure of the TIO.

TABLE A

TIO Structure

| HASH | TRUST VECTOR |
|---|---|
| Hash ($C_1$), | $TV_1$ |
| Hash ($C_2$) | $TV_2$ |
| ... | ... |
| Hash ($C_N$) | $TV_N$ |
| Number of Signatures | |
| Timestamp | |
| Signatures | |

TIO Structure

Where:

$C_i$—is a trusted entity's certificate, e.g. a CA root certificate or SSL server certificate (for optimal performance, i.e. minimum amount of TIO update and certificate fetching, the hash value can be taken on the certificate excluding the validity and serial number);

$TV_i$—is the trust vector of certificate i;

Number of Signatures—specifies the number of signatures required for the next update;

Timestamp—is the date the TIO is created; and

Signature—is the digital signature of all the data including the

Certificates, the Trust Vectors, the Number of Signatures, and the Timestamp, contained in the TIO.

The preferred hash function can be either MD5 or SHA-1. For maximum security, SHA-1 is presently preferred. The ASN.1 (see Abstract Syntax Notation) definition of the TIO, which follows the PKCS#7 standard (e.g., The Public-Key Cryptography Standards (PKCS), RSA Data Security, Inc., Version 1.5, revised Nov. 1, 1993), and the semantics of each bit in the trust vector (TV) are described in greater detail below. Because the output of the hash function has a fixed length of twenty bytes maximum, i.e. when using SHA-1, and the TV is likely from one to two bytes, the size of the whole table is very small. Thus, the TIO readily fits into consumer devices, such as set-top boxes, cell phones, hand held computers, and pagers. For example, a TIO derived from 50 Root Certificates has the size of around 1 k. Furthermore, with a TIO containing the hash values of the most popular root CA certificates, clients are capable of communicating with the majority of the secure web sites.

At the software development stage, a TIO derived from a set of popular root CA certificates is hard coded into the client software. In this embodiment, where the client, i.e. the consumer device, has flash memory 16, a copy of the TIO is saved in the flash memory during the client build time. The TIO is periodically updated thereafter using a mechanism described below.

SSL Server Authentication

During the SSL handshake (100; see FIG. 2) between the client and the server, the server sends a certificate chain that may or may not contain the root certificate (RC) to the client (102).

Figure 2:
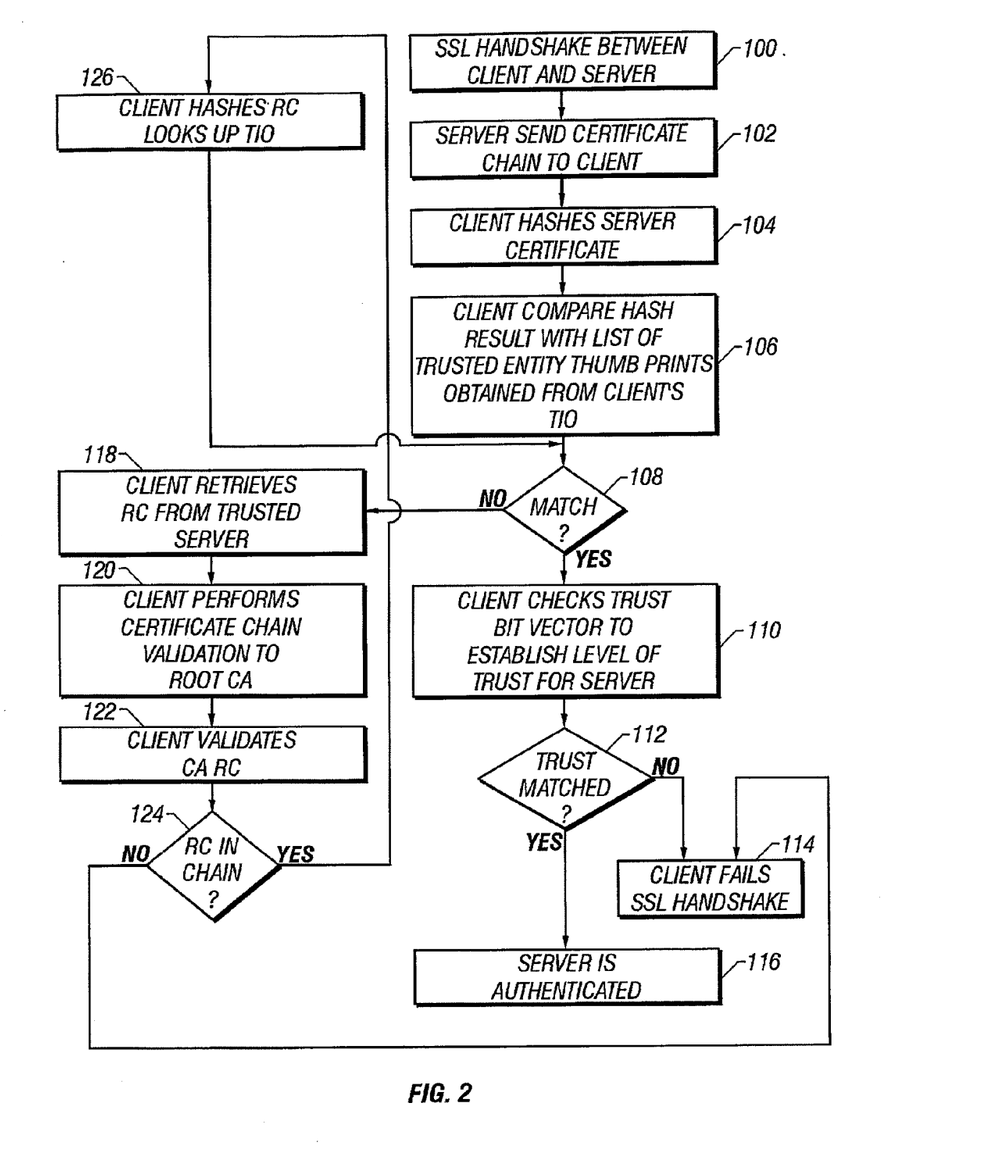
FIG. 2 is a flow diagram showing SSL authentication according to the invention.

The client can validate the server certificate by the following procedure:

1. The client hashes the server certificate (104) using SHA-1, assuming that SHA-1 is used in the construction of TIO, and compares the resulting digest against the list of trusted entity certificate thumbprints obtained from the TIO (106). If a match is not found (108), step #2 below is performed. If a match is found (108), the client checks the trust bit vector associated with the certificate to ensure that the authenticated server is trusted in the context of the SSL session being established (110). If the necessary trust capabilities are not set on the matched thumbprint (112), the client fails the SSL handshake (114). Otherwise, the server is deemed authenticated (116), provided that the remaining steps of the SSL handshake protocol are successfully completed.

2. In the case where the chain does not contain the RC, the client first retrieves the RC from a trusted server through the normal HTTP operations (118). Without loss of generality, it is assumed that the RC is available in the client. Then the client goes through the normal certificate chain validation up to the root CA (120). Once the entire chain is validated, the client tries to validate the CA RC (122). If the RC is included in the chain (124), then the client hashes the RC and looks up the TIO in the client (126). If the hash value and a corresponding trust bit (which indicates that the CA is trusted to issue SSL server certificates) are found in the TIO 108, 110, 112, then the certificate chain is considered to be valid and the SSL handshake procedure proceeds 116. Otherwise, the certificate chain validation fails and the SSL negotiation stops 114.

CA root certificates have a finite life span and expire from time to time. However, the expiry of a certificate does not imply that the certificate is compromised and no longer can be used. Most CAs generate their new CA certificates using the old key pairs to minimize transition problems. In this situation, the old root certificates can still be trusted. To minimize the amount of CA fetching and TIO update, the hash value in the TIO can be taken by hashing the certificate, excluding the validity and serial number. Doing so, the certificate described in the above SSL authentication process is accepted by the validation mechanism, even when the client receives an expired CA root certificate. This does not create a security hole as long as the TIO provider knows that the CA certificate is still valid.

Access Control

Figure 3:
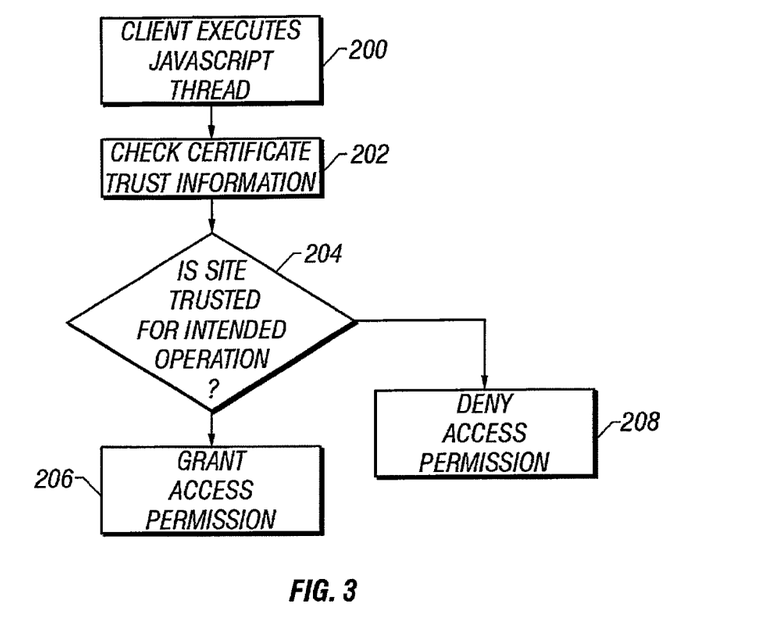
FIG. 3 is a flow diagram showing Javascript access control according to the invention.

In general, client devices include a set of specific data, saved by the manufacturer or the service provider, that are accessible only to the trusted applications. The update of these pieces of data is typically through Javascript or Java due to the mobility of these languages, although other languages can be used. In one embodiment (see FIG. 3), a designated trust bit with the site certificate in the TIO is used to identify a site that is trusted to perform special operations. When the client executes a Javascript thread (200) it checks the certificate and associated trust information (202). If the trust bit indicates that the site identified by its certificate is trusted for the intended operation (204), then access permission is granted (206). Otherwise, the client rejects the access (208).

Root Certificates Update

A TIO that is hard coded in the client software or saved in the flash memory of the client device provides the trust basis for the client to make SSL connections. As is known, certificates may become invalid from time to time. Thus, a mechanism that allows TIO providers to update the TIO contained in flash memory is necessary. The following discussion describes two different TIO update schemes: one of these schemes is suitable for clients having flash memory, e.g. NVRAM, while the other scheme is useful for clients that do not have any local persistent storage.

Client with Flash/NVRAM

Figure 1:
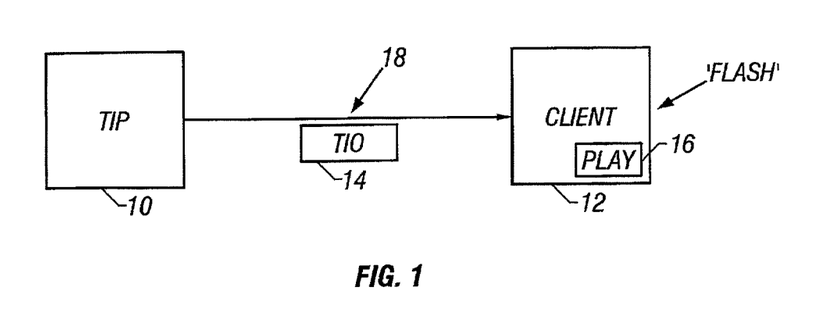
FIG. 1 is an architectural block schematic diagram of a trust information delivery scheme for certificate validation according to the invention.

In this case, the client device has a copy of the TIO in flash memory (see FIG. 1). In the preferred embodiment, the TIO is delivered to the client through one of two channels 18, i.e. broadcast or HTTP.

Figure 4:
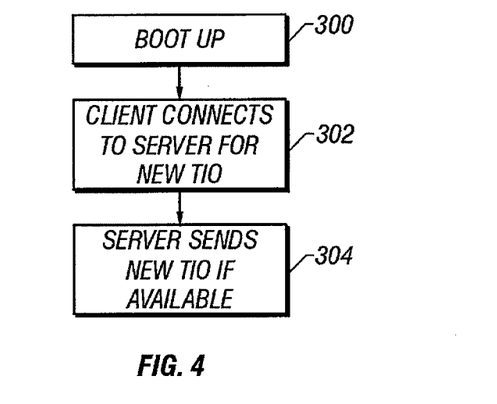
FIG. 4 is a flow diagram showing HTTP update according to the invention in a persistent storage client device.

In the case of using HTTP over an SSL channel to deliver the TIO (see FIG. 4), the TIO does not need to be signed. Although it can also optionally be signed. At boot-up time 300, the client connects to the server 302 to ask whether a new TIO is available, and the server sends the new TIO 304 to the client through the normal HTTP if there is a more recent TIO.

Figure 5:
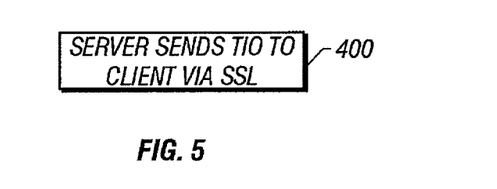
FIG. 5 is a flow diagram showing broadcast update according to the invention in a persistent storage client device.

In the broadcast situation (see FIG. 5), the TIO must be signed. For the client to verify the signature of the TIO, the signing certificate of the authority, which may be a CA, software provider, or the cable operator, must be delivered to the client before hand. To that end, the cable operator (for example) must send a TIO including the signing certificate to the client through the SSL channel before using the broadcast method 400. The trust information of the signing certificate indicates that this certificate can be trusted for signing the TIO. The update procedure, depending on the mechanism (HTTP or broadcast), is illustrated in the following:

Update Via HTTP

In the case where the client is capable of performing SSL, the client can fetch the TIO from the trusted server through HTTP over SSL, or via HTTPS. Because SSL guarantees the security of the delivery, the new TIO does not need to be signed and thus no signature verification is needed. However, the client must ensure that the root certificate that signed the trusted server certificate is contained in the new TIO and not revocable, as indicated by the trust bit associated with the certificate. This check is performed to guarantee that the system is always recoverable even when a malicious TIO hacks into the client. Otherwise, there is a potential situation that can cause the client device to fail. For example, if the server is compromised and a hacker manages to send a malicious TIO that contains only a malicious root certificate to the client, then the client can never connect to the server again because the SSL server authentication fails. With a root certificate that signed the trusted server certificate that is not revocable, the client can always connect to the server through SSL to fetch a valid TIO and get rid of the malicious TIO. Then the client checks the timestamp that is embedded in the TIO. If it is valid, e.g. later in time than the previous TIO, then the old TIO is replaced with the downloaded TIO. Otherwise, the client rejects the update request.

In the case where the TIO is digitally signed due to the requirement of a security policy or lack of support for SSL, the client verifies the digital signatures of the TIO with the signing certificates along with the TIO sent to the client. Here, multiple signatures may be verified, depending on the number of signatures specified in the TIO. Then the client hashes the signing certificates one by one. If the proper results are found in the TIO and the trust bits indicate that these certificates are trusted for signing TIO, then the TIO proves that it was not tampered with. Finally, the client verifies the timestamp in the same way as mentioned above.

Note that the signing certificates must exist in the TIO in the client before the TIO is signed. Otherwise, the signing certificates cannot be validated. To that end, the TIO providers can either choose CAs whose root certificates are included in the initial TIO embedded in the client to sign the TIO, or they can use an SSL channel to deliver a TIO that contains the signing certificates to the client before signing the TIO.

Update Via Broadcast

In many environments, such as cable television, centralized data can be delivered to end users by broadcast. The biggest advantage of broadcast is its efficiency. To take this advantage, the TIO can be delivered to clients by broadcast. In this case, the TIO must be signed because the broadcast channel is usually not secure. The client can verify the TIO by the same procedure discussed above. The TIO providers deliver a TIO that contains the signing certificate and associated trust information to the client by either including the signing certificate in the initial TIO saved in the client flash, or by sending the TIO to the client through the SSL channel before using the broadcast channel.

Client Without Persistent Storage

Figure 6:
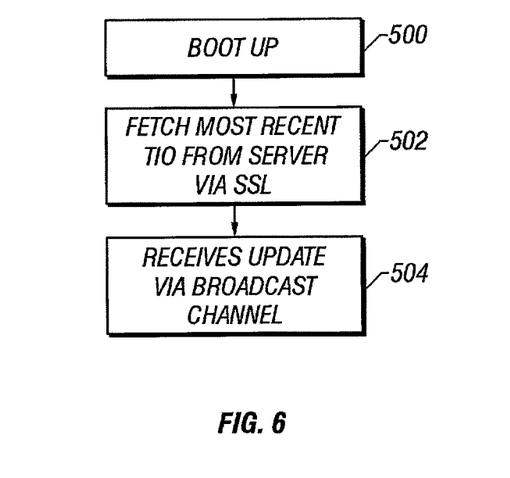
FIG. 6 is a flow diagram showing client device update according to the invention in a device that does not include persistent storage.

In this situation (see FIG. 6), the same TIO update mechanism, e.g. HTTP/HTTPS channel or broadcast, as discussed above can be applied. However, the update must occur on a per session basis because the TIO can only be cached in the device memory, i.e. it is not persistently stored. This means that, at each boot-up time 500, the client must fetch the most recent TIO from the server through the SSL channel 502 and receive any update thereafter from the broadcast channel 504. If a root certificate in the client TIO is compromised or insecure, a software update cannot be avoided. Because the chance of a root CA certificate being insecure is very small (it may not even happen at all at least, there is no such evidence so far after more than five years of CA practice in the industry), the concern for the frequency of the software update can be ignored.

Note that expiration of a root CA certificate does not require updating of the TIO because the expiry of a root certificate only creates robustness problems, but not security implications if the key of the certificate known to be valid. The fact that the TIO update is not needed even when a root CA certificate in the TIO is expired is true only if the renewed CA certificate shares the same public key with the old one. That is, the renewal differs from the old one only by validity. If the renewal changed the key then TIO update is needed. The TIO does not need to be updated when the new CA certificate shares the same key with the old one because of the nature of the public key cryptography. If the new CA certificate shares the same key with the old one, then the server certificate issued by the new CA can be cryptographically verified by the new CA certificate if and only if it can be verified cryptographically by the old CA certificate. That means the new CA certificate plays the same role as the old one in verification of the server certificate.

The only situation that the expiry of root certificates causes a software update is when all the root certificates in the TIO are expired and their corresponding key pairs are changed. This is because the SSL session between the trusted server that provides the TIO and the client cannot be established. However, the chance for this to happen is very small because a new software release is likely to happen before all of the root certificates have expired. Thus, a cable operator (for example) can always choose a CA known to be valid in the TIO to issue its trust server certificate, and the SSL session between the client and the trust server can be established all the time. Once the SSL session between the client and the server is established, the client can fetch the most recent TIO, which contains only the valid root certificates, from the server and updates the old one with the same procedure described above. The new TIO is then cached in the memory for the subsequent SSL session establishments.

ASN.1 Definition of Trust Information Object (TIO)

In the presently preferred embodiment of the invention, when the TIO is signed, it is implemented using the PKCS #7 data format with the SignedData encapsulation format. Table "B" below describes how the SignedData content type is used for this purpose.

TABLE B

Use of the Signed Data Format to Implement the TIO

| PKCS #7 Field Name | Description |
| --- | --- |
| SignedData.version | The PKCS #7 standard version shall specify version 1. |
| SignedData.digestAlgorithms | The digest algorithms -- shall specify SHA-1 and, optionally, others. |
| SignedData.contentInfo.contentType | The type of data being signed - shall specify Trust-Info, as defined below |
| SignedData.contentInfo.content | The data being signed -- shall contain the DER encoding of the ASN.1 object TrustInfo, as defined below |
| SignedData.certificates | This is the list of root certificate fingerprints and associated trust information. |
| SignedData.crls | Not used (omitted). |
| SignedData.signerInfos | The version number for the digital signature format-shall specify version 1 |
| SignedData.signerInfos.authenticatedAttribute | Not used (omitted). |
| SignedData.signerInfos.digestEncryption Algorithm | The digital signature algorithm - shall specify RSA. |
| SignedData.signerInfos.encryptedDigest | The digital signature. |
| SignedData.signerInfos.unauthenticatedAttrributes | Not used (omitted). |

The following is the ASN.1 definition for the Trust Information Object which is DER encoded into the SignedData.contentInfo.content field of the PKCS#7 SignedData object described in Table "B."

```
TrustInfoObject ::=SEQUENCE
{       timeStamp    UTCTime
  trustInfo      TrustInfo
  {
  TrustInfo ::= SET OF TrustEntity
``` timeStamp: The date the TIO is generated. This is a coordinated universal time or Greenwich Mean Time (GMT) value.

```
TrustEntity ::= SEQUENCE
{
    trustAttribute     CAType
    thumbPrint         BIT STRING
}
``` trustAttribute: The trust information associated with an entity represented by its certificate.

thumbPrint: The SHA-1 hash of the public key embedded in the certificate that represents a trusted entity.

```
CAType ::= BIT STRING
{
        TIOCA (0),-- CA trusted to sign the TIO. This bit is used in the
verification of a signed TIO. The client checks whether this particular bit
in the trust vector is turned on when the TIO signing certificate hash is
found in the TIO --
        SslClientCA   (1),-- CA trusted to issue certs for SSL clients. This
bit is used to authenticate server certificates in SSL. The client checks
whether this particular bit in the trust vector associated with the root CA
certificate that signed the SSL server certificate is turned on --
        SslServerCA   (2),-- CA trusted to issue certs for SSL servers --
        SslServerCert   (3)-- SSL server certificate, this bit indicates whether
a received server certificate in SSL can be trusted as a SSL server
certificate --
        appSwPubCA   (4), -- CA trusted to issue certificates for Application
Software Publishers. This bit is used for software update. When a new
version of software, either signed or from a secure server (SSL server),
delivered to the client, the client checks this bit to see whether the
associated certificate is trusted for the intended access. --
        privAppCA (5)   -- CA trusted to issue certificates for Privileged
Application Provider. This bit is for Java and/or Javascript access control.
If this bit is turned on for a root CA certificate then any downloaded
applications, signed or over SSL, whose associated certificates are signed
by this CA are qualified to perform pre-defined privileged operations. --
        }
```

Note that the trust bits can be added or removed depending on the requirements. For example, a TIO provider may use a few bits to support multiple levels of Javascript/Java access control. In this case, each bit identifies a privilege level. The presently preferred embodiment of the invention uses only one bit, namely privAppCA for this purpose.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method comprising:
   receiving, from a computing device, an unverified root certificate, wherein the unverified root certificate is for certifying the computing device;
   hashing a public key portion of the unverified root certificate to generate a digest;
   certifying the computing device responsive to the digest matching one of a first plurality of previously stored hash values;
   receiving a trust information object comprising a second plurality of hash values and a plurality of trust vectors; and
   overwriting the first plurality of previously stored hash values and a plurality of previously stored trust vectors with the second plurality of hash values and the plurality of trust vectors, respectively.

2. The method of claim 1, wherein the unverified root certificate comprises a signing certificate associated with one of a certificate authority, a software provider, and a content provider.

3. The method of claim 1, wherein the hashing is performed via an MD5 or SHA-1 algorithm.

4. The method of claim 1, wherein the first plurality of previously stored hash values is associated with an earlier timestamp than the second plurality of hash values.

5. The method of claim 1, further comprising:
   determining that the computing device is trusted for a secure connection by examining a bit of one of the plurality of previously stored trust vectors; and
   establishing the secure connection.

6. The method of claim 1, further comprising:
   receiving information related to a number of signatures required for a next update of the second plurality of hash values.

7. A method comprising:
   receiving, from a computing device, a certificate chain comprising a plurality of unverified certificates, wherein the plurality of unverified certificates comprises a first unverified certificate of a certificate authority issuing the plurality of unverified certificates;
   hashing the first unverified certificate to generate a digest;
   certifying the computing device responsive to the digest matching one of a first plurality of previously stored hash values;
   starting a session with the computing device;
   receiving a second plurality of hash values and a plurality of trust vectors; and
   overwriting the first plurality of previously stored hash values and a plurality of previously stored trust vectors with the second plurality of hash values and the plurality of trust vectors, respectively.

8. The method of claim 7, wherein the receiving the second plurality of hash values and the plurality of trust vectors comprises receiving the second plurality of hash values and the plurality of trust vectors via a secure transmission channel.

9. The method of claim 7, wherein the certificate chain comprises a signing certificate associated with one of the certificate authority, a software provider, and a content provider.

10. The method of claim 7, wherein the hashing is performed via an MD5 or SHA-1 algorithm.

11. The method of claim 7, wherein the first plurality of previously stored hash values is associated with an earlier timestamp than the second plurality of hash values.

12. The method of claim 7, further comprising:
   determining that the computing device is trusted for a secure connection by examining a bit of one of the plurality of previously stored trust vectors; and
   establishing the secure connection.

13. The method of claim 7, further comprising:
   receiving information related to a number of signatures required for a next update of the second plurality of hash values.

14. A method comprising:
   receiving, from a computing device, a first trust information object comprising at least a plurality of hash values, each hash value being hashed from a trusted entity certificate, and a plurality of trust vectors, each trust vector corresponding to one of the plurality of hash values, the trust vectors indicative of a level of trust associated with a particular trusted entity certificate;
   receiving, from the computing device, an unverified root certificate, wherein the unverified root certificate is for certifying the computing device;
   hashing a public key portion of the unverified root certificate to generate a digest;
   determining that the digest matches one of a first plurality of previously stored hash values;
   starting a session with the computing device;
   receiving a second trust information object; and
   overwriting the first trust information object with the second trust information object.

15. The method of claim 14, wherein the unverified root certificate comprises a signing certificate associated with one of a certificate authority, a software provider, and a content provider.

16. The method of claim 14, wherein the hashing is performed via an MD5 or SHA-1 algorithm.

17. The method of claim 14, wherein the first trust information object is associated with an earlier timestamp than the second trust information object.

18. The method of claim 15, further comprising:
determining that the computing device is trusted for a secure connection by examining a bit of a previously stored trust vector associated with the digest; and
establishing the secure connection.

19. The method of claim 14, further comprising:
receiving information related to a number of signatures required for a next update of the second trust information object.

* * * * *